United States Patent [19]

Lopata

[11] 4,131,305
[45] Dec. 26, 1978

[54] LEADER PIN

[76] Inventor: Ira Lopata, 35 Sutton Pl., New York, N.Y. 10022

[21] Appl. No.: 796,027

[22] Filed: May 11, 1977

[51] Int. Cl.² .............................................. B65H 75/28
[52] U.S. Cl. ........................................ 242/74; 242/197
[58] Field of Search ............... 242/74, 74.1, 60, 195, 242/197

[56] References Cited

U.S. PATENT DOCUMENTS

| 1,309,393 | 7/1919 | Carter | 242/60 |
| 1,599,769 | 9/1926 | Jaynes | 242/74 |
| 1,649,470 | 11/1927 | Hayden | 242/74 |
| 4,027,832 | 6/1977 | Lopata | 242/197 |

Primary Examiner—Edward J. McCarthy
Attorney, Agent, or Firm—Norman N. Popper; Daniel H. Bobis

[57] ABSTRACT

A leader pin, providing a slotted rod received in a tube, with a first fin on the rod positioned to prevent a strip in the slot from moving transversely; and a second fin on the rod to prevent the tube from disengaging from the rod.

10 Claims, 5 Drawing Figures

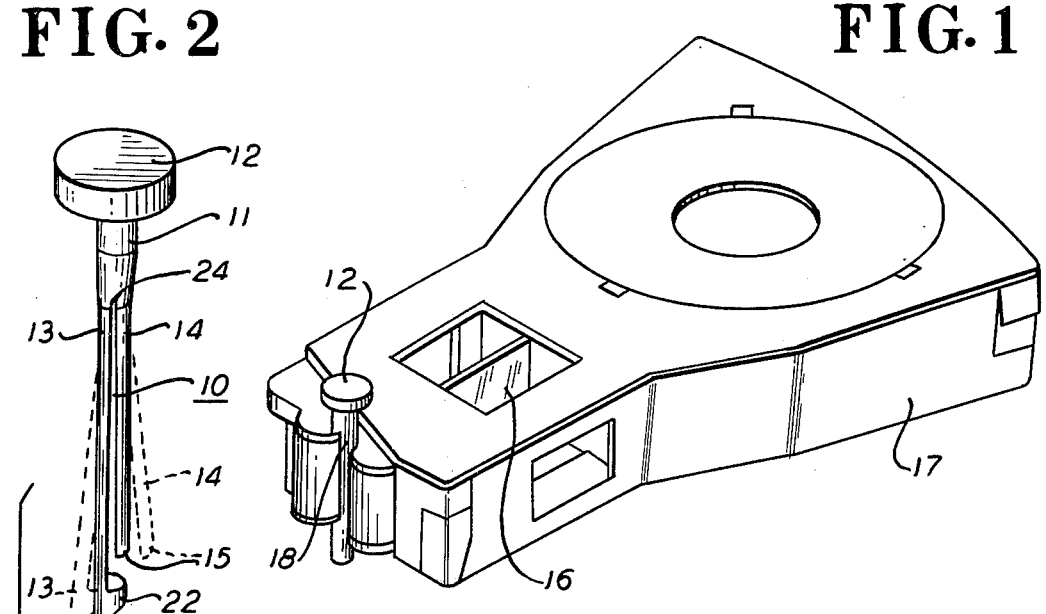
FIG. 2   FIG. 1
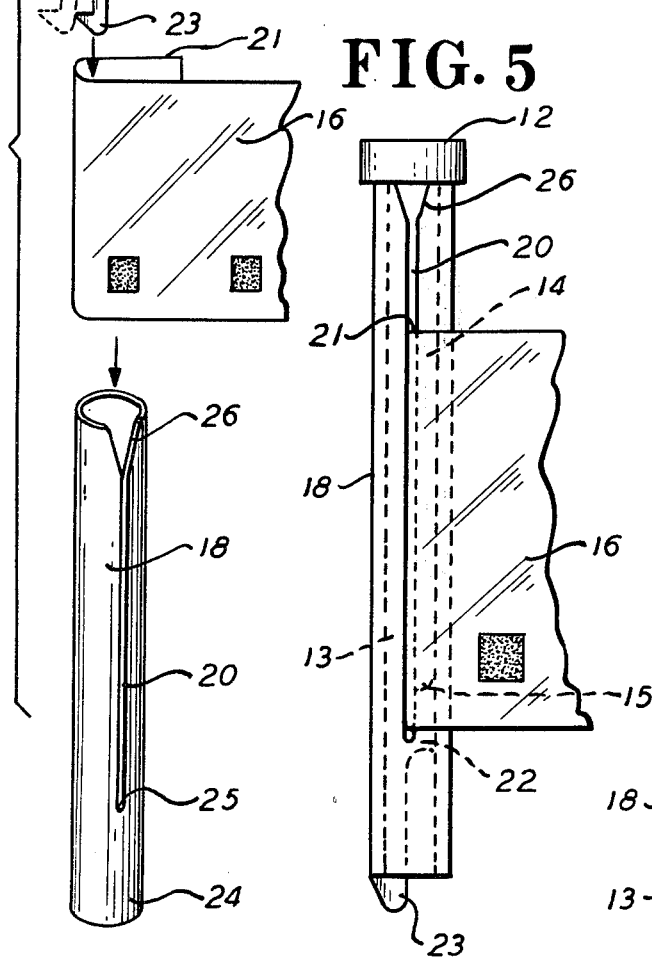
FIG. 5   FIG. 3
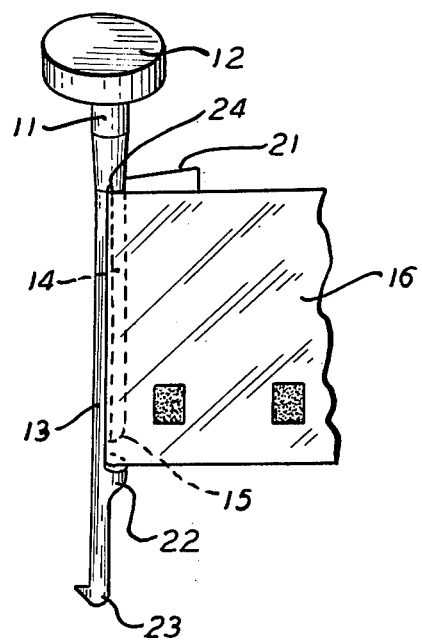
FIG. 4
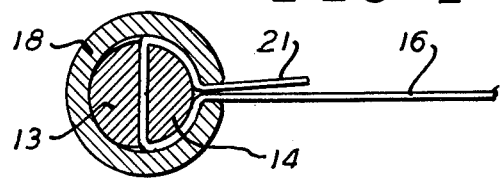

LEADER PIN

CROSS REFERENCE

This leader pin provides an improvement on the invention of U.S. Pat. application Ser. No. 679,691 filed Apr. 23, 1976, now U.S. Pat. No. 4,027,832.

BACKGROUND OF INVENTION

1. Field of Invention

This invention relates generally to leader pins affixed to the end of a film strip or to a magnetic tape wound in a cassette, to enable the strip or tape to be rapidly withdrawn from the cassette to a pre-selected portion for inspection, and particularly to such a leader pin in which the strip or tape is restrained against lateral displacement from the leader pin, and the rod is restrained against withdrawal from a tube surrounding it.

2. Prior Art

The invention of the Ser. No. 679,691 patent was a leader pin particularly devised for use with the cassette disclosed in patent Ser. No. 578,680, now U.S. Pat. No. 4,025,176. It functioned very well, except that films engaged with the leader pin sometimes moved obliquely and transversely with respect to the leader pin, causing inaccurate automatic frame location. At times the tube embracing the rod became latitudinally displaced, giving rise to concern that it might become altogether disengaged from the rod. Strips held on the rod by the embracing tube were able to slide transversely because the slit in the tube extended from end to end.

SUMMARY OF INVENTION

These concerns led to the devising of means to prevent the displacement of the strip, and likewise to prevent the possible disengagement of the rod from the tube. It was found that the formation of a first transverse fin on the rod immediately adjacent to the slot would restrain a strip in the slot from latitudinal displacement; also it was found that if the slit in the tube extended only to the first fin, that would also help to restrain the strip. And it was similarly found that the formation of a second transverse fin on the rod near the end thereof would form a detent, to prevent the discharge of the rod from engagement with the tube. In this manner, the high speed spooling and unspooling of the strip from a cassette would not cause any malfunction of a system by reason of loosening the leader pin, or the displacement of a strip in the slot.

DRAWINGS

These objects and advantages as well as other objects and advantages may be attained by the device shown by way of illustration in the drawing in which:

FIG. 1 is a perspective view of a cassette containing a strip to which a leader pin has been applied;

FIG. 2 is a perspective view of a leader pin, strip, and tube in spaced relation to each other;

FIG. 3 is a perspective view of the leader pin with a strip in the slot;

FIG. 4 is a cross-sectional view of a strip assembled with a leader pin and a slotted tube; and FIG. 5 is a vertical elevational view of a tube and rod assembled.

PREFERRED EMBODIMENT

Referring now to the drawings in detail, the improved leader pin provides a deflectable rod 11, with a knob 12 at one end. There is a bifurcated section at the other end of the rod 11 defining a longitudinal slot 10 between a short portion 13 and a longer portion 14. The end 15 of the short portion 13 is undercut to permit ease of insertion of a strip 16 into the longitudinal slot. The slot 10 does not extend all the way to the knob 12. The rod 11 is preferably somewhat deflectable to permit the passage of fins through a tube.

The leader pin is to be seated on a cassette 17, from which the strip 16 is to be unspooled at high speed in an automatic information retrieval system. When the end of a strip 16 is inserted in the slot between the bifurcated sections 13, 14, the end 21 of the strip is brought close to the main portion of the strip 16. A tube 18 preferably rigid, having a longitudinal slit 20 is applied to the rod 11, with the end 21 of the strip 16 and the main portion of the strip 16 passing through the slit 20 as shown in FIG. 4. The strip 16 is now engaged firmly between the short and long portions 13, 14. The slit 20 does not extend all the way to the end 24 of the tube 18 but ends at a point generally coincidental with the first fin 22.

A first fin 22 is formed on the longer portion 13 of the bifurcated section on the end of the rod 11. The fin 22 extends transversely across a plane defined by the slot i.e. defined by the longitudinal axis of the rod 11. This first fin serves to restrain a strip 16 in the slot against latitudinal movement in the slot; the distance from the first fin 22 to the opposite end 24 of the slot is generally equal to the width of the film 16.

A second fin 23 is formed on the longer portion 13 of the bifurcated section of the rod 11. This second fin 23 extends in the opposite direction from the fin 22 and is near to the end of the portion 14, i.e. the second fin 23 extends away from a plane defined by the slot in the rod 11. The second fin 23 is positioned to prevent axial movement of the tube 18 when the tube is mounted on the rod 11. It restrains the tube 18 from moving off the rod 11. Since the tube 18 is not resilient, the rod 11 is deflectable to slide over the second fin 23. Both the first fin 22 and the second fin 23 have a flat surface directed respectively toward the side edge of the strip 16, and the edge of the tube 18. This leader pin provides secure holding of a strip against displacement, and secure holding of the tube 18 against unintended disengagement.

What is claimed:

1. A leader pin comprising:
   (a) a rod,
   (b) a knob on one end of the rod,
   (c) a bifurcated section at the other end of the rod, defining a longitudinal slot for a strip to be inserted therebetween,
   (d) one portion of the bifurcated section at the other end of the rod being longer than the other,
   (e) a first fin on the longer portion of the bifurcated section extending across a plane defined by the slot, to restrain a strip in the slot against latitudinal movement in the slot,
   (f) an elongated tube dimensioned to receive the rod,
   (g) a longitudinal slit in the tube through which the strip in the slot may extend,
   (h) the rod positioned in the tube,
   (i) a second fin on the longer portion of the bifurcated section of the rod extending away from a plane defined by the slot in the rod, to restrain the rod from sliding out of the tube when they are engaged together.

2. A leader pin comprising:
(a) the device according to claim 1,
(b) the length of the slot to the first fin defining a distance generally corresponding to the width of a strip.

3. A leader pin comprising:
(a) the device according to claim 1,
(b) the length of the slit in the tube defining a distance generally equal to the width of the strip to be received in the slot.

4. A leader pin comprising:
(a) the device according to claim 1,
(b) the rod being deflectable.

5. A leader pin comprising:
(a) the device according to claim 1,
(b) the length of the tube defining a distance generally equal to the distance between the knob and the second fin.

6. A leader pin comprising:
(a) the device according to claim 1,
(b) a strip in the slot, engaged at one side edge with the knob and at the other side edge with the first fin.

7. A leader pin comprising:
(a) the device according to claim 2,
(b) a strip in the slot, engaged at one side edge with the knob and at the other side edge with the first fin.

8. A leader pin comprising:
(a) the device according to claim 3,
(b) a strip in the slot, engaged at one side edge with the knob and at the other side edge with the first fin.

9. A leader pin comprising:
(a) the device according to claim 4,
(b) a strip in the slot, engaged at one side edge with the knob and at the other side edge with the first fin.

10. A leader pin comprising:
(a) a rod,
(b) a knob on one end of the rod,
(c) a bifurcated section at the other end of the rod, defining a longitudinal slot for a strip to be inserted therebetween,
(d) one portion of the bifurcated section at the other end of the rod being longer than the other,
(e) a first fin on the longer portion of the bifurcated section extending across a plane defined by the slot, to restrain a strip in the slot against latitudinal movement in the slot,
(f) an elongated tube dimensioned to receive the rod,
(g) a longitudinal slit in the tube through which the strip in the slot may extend,
(h) the rod positioned in the tube,
(i) a second fin on the longer portion of the bifurcated section of the rod extending away from a plane defined by the slot in the rod, to restrain the rod from sliding out of the tube when they are engaged together,
(j) the length of the slot to the first fin defining a distance generally corresponding to the width of a strip,
(k) the length of the slit in the tube defining a distance generally equal to the width of the strip to be received in the slot,
(l) the rod being deflectable,
(m) the length of the tube defining a distance generally equal to the distance between the knob and the second fin,
(n) the end of the tube seated against the knob and at the other end against the second fin,
(o) a strip in the slot, engaged at one side edge with the knob and at the other side edge with the first fin.

* * * * *